United States Patent
Sato et al.

(10) Patent No.: US 12,320,565 B2
(45) Date of Patent: Jun. 3, 2025

(54) REFRIGERATION CYCLE DEVICE

(71) Applicant: Mitsubishi Electric Corporation, Tokyo (JP)

(72) Inventors: Masanori Sato, Tokyo (JP); Takumi Nishiyama, Tokyo (JP); Kenta Murata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 222 days.

(21) Appl. No.: 17/798,933

(22) PCT Filed: Apr. 7, 2020

(86) PCT No.: PCT/JP2020/015671
§ 371 (c)(1),
(2) Date: Aug. 11, 2022

(87) PCT Pub. No.: WO2021/205539
PCT Pub. Date: Oct. 14, 2021

(65) Prior Publication Data
US 2023/0067007 A1    Mar. 2, 2023

(51) Int. Cl.
*F25B 43/00* (2006.01)
*C09K 5/04* (2006.01)
(Continued)

(52) U.S. Cl.
CPC .............. *F25B 43/00* (2013.01); *C09K 5/044* (2013.01); *F25B 1/00* (2013.01); *F25B 41/31* (2021.01);
(Continued)

(58) Field of Classification Search
CPC .. F25B 43/00; F25B 1/00; F25B 41/31; F25B 41/20; F25B 2400/053; F25B 2400/054;
(Continued)

(56) References Cited

U.S. PATENT DOCUMENTS 6,718,781 B2 * 4/2004 Freund .................... F25B 49/02
62/199
7,137,270 B2 * 11/2006 Lifson .................... F25B 13/00
62/196.4
(Continued)

FOREIGN PATENT DOCUMENTS

CN    1157860 A  *  8/1997  .......... C23C 14/564
EP    2136158 A1    12/2009
(Continued)

OTHER PUBLICATIONS

Ji Hwan Jeong and Sarwar Alam, Thermodynamic properties and critical parameters of HFO-1123 and its binary blends with HFC-32 and HFC-134a using molecular simulations, International Journal of Refrigeration (Year: 2019).*

(Continued)

*Primary Examiner* — Kun Kai Ma
(74) *Attorney, Agent, or Firm* — Posz Law Group, PLC

(57) ABSTRACT

A refrigeration cycle device includes: a refrigerant circuit which circulates a mixed refrigerant containing at least CF3I and HFO1123, the RC including a compressor, an expansion valve, an indoor heat exchanger, an outdoor heat exchanger and a refrigerant reservoir; an injection pipe having a first end at a first height within the refrigerant reservoir and a second end connected to the compressor; and an injection valve included in the injection pipe. The CF3I has the greatest fluid density among refrigerants contained in the mixed refrigerant. The first height is higher than a height at which an end of a refrigerant pipe, other than the injection pipe, is located within the refrigerant reservoir.

7 Claims, 6 Drawing Sheets

(51) Int. Cl.
*F25B 1/00* (2006.01)
*F25B 41/31* (2021.01)

(52) U.S. Cl.
CPC .. *C09K 2205/122* (2013.01); *C09K 2205/126* (2013.01); *C09K 2205/24* (2013.01); *F25B 2500/18* (2013.01)

(58) Field of Classification Search
CPC ............. F25B 2400/23; F25B 2500/07; F25B 2600/2509; F25B 2600/2515; F25B 2700/21152; F25B 13/00; F25B 41/39; F25B 49/02; C09K 5/044; C09K 2205/122; C09K 2205/126; C09K 2205/24
See application file for complete search history.

(56) References Cited

U.S. PATENT DOCUMENTS

| | | | |
|---|---|---|---|
| 8,899,058 B2 * | 12/2014 | Unezaki | F25B 13/00 62/197 |
| 2016/0320111 A1 | 11/2016 | Saikusa et al. | |
| 2019/0203092 A1 * | 7/2019 | Schultz | C09K 5/044 |

FOREIGN PATENT DOCUMENTS

| | | | | | |
|---|---|---|---|---|---|
| JP | 2004278825 A | * | 10/2004 | | |
| JP | 2006177598 A | * | 7/2006 | | |
| JP | 2013-204936 A | | 10/2013 | | |
| JP | 2017-145380 A | | 8/2017 | | |
| JP | 2018-169052 A | | 11/2018 | | |
| KR | 20040066028 A | * | 7/2004 | | |
| WO | WO-2006028218 A1 | * | 3/2006 | ............. | F25B 13/00 |
| WO | 2014/156743 A1 | | 10/2014 | | |
| WO | 2015/136703 A1 | | 9/2015 | | |
| WO | WO-2017175299 A1 | * | 10/2017 | ................ | F25B 1/00 |
| WO | WO-2018181057 A1 | * | 10/2018 | ................ | F25B 1/00 |
| WO | WO-2019240205 A1 | * | 12/2019 | ............. | C09K 5/045 |
| WO | 2020/039707 A1 | | 2/2020 | | |
| WO | 2020/049844 A1 | | 3/2020 | | |

OTHER PUBLICATIONS

Office Action issued Jan. 11, 2023 in corresponding IN Patent Application No. 202227052815.
International Search Report of the International Searching Authority mailed Jun. 2, 2020 for the corresponding International application No. PCT/JP2020/015671 (and English translation).
Extended European Search Report dated Apr. 26, 2023 issued in corresponding European Patent Application No. 20930550.7.

* cited by examiner

REFRIGERATION CYCLE DEVICE

CROSS REFERENCE TO RELATED APPLICATION

This application is a U.S. national stage application of PCT/JP2020/015671 filed on Apr. 7, 2020, the contents of which are incorporated herein by reference.

TECHNICAL FIELD

The present disclosure relates to a refrigeration cycle device.

BACKGROUND ART

A refrigeration cycle device is known which uses a mixed refrigerant that contains trifluoroiodomethane (CF3I) having low global warming potentials, as a refrigerant that circulates around a refrigerant circuit. A refrigeration cycle device is known which manages the temperature of a refrigerant discharged from a compressor in the refrigeration cycle (hereinafter, a discharge temperature) so as to not exceed a predetermined temperature because CF3I, when raised to a high temperature, has negative impact on thermochemical stabilities. For example, a refrigeration cycle device disclosed in PTL 1 includes: a refrigeration cycle which circulates a refrigerant containing CF3I, the refrigeration cycle including a compressor, a condenser, an evaporator, and an evaporator-side expansion valve; an suction pressure sensor for measuring the suction pressure of the refrigerant suctioned into the compressor; a discharge pressure sensor for measuring the discharge pressure of the refrigerant discharged from the compressor; and a control means which opens the injection valve to the compressor and reduces the discharge temperature if the discharge temperature estimated from the suction pressure and the discharge pressure is greater than or equal to a predetermined value.

CITATION LIST

Patent Literature

PTL 1: WO2020/039707

SUMMARY OF INVENTION

Technical Problem

HFO1123 having low global warming potentials and a great gas density may be desired to be added to a mixed refrigerant. However, the use of such a mixed refrigerant that contains CF3I and HFO1123 causes the following problem.

Since HFO1123 has characteristics of causing a disproportionation reaction, it is contemplated that a refrigerant that contains a large amount of CF3I, which has a suppressive effects on the disproportionation reaction, is injected to the compressor. However, a low ratio of CF3I in the refrigerant cannot suppress the disproportionation reaction. In contrast, a high ratio of CF3I in in the refrigerant, for purpose of suppressing the disproportionation reaction, deteriorates the performance of the refrigeration cycle device.

Therefore, an object of the present disclosure is to provide a refrigeration cycle device that can suppress the disproportionation reaction and prevent deterioration of the performance of the refrigeration cycle device.

Solution to Problem

A refrigeration cycle device according to the present disclosure includes: a refrigerant circuit which circulates a mixed refrigerant containing at least CF3I and HFO1123, the refrigerant circuit including a compressor, an expansion valve, an indoor heat exchanger, an outdoor heat exchanger, and a refrigerant reservoir; an injection pipe which includes a first end at a first height within the refrigerant reservoir and a second end connected to the compressor; and an injection valve included in the injection pipe. The CF3I has a greatest fluid density among refrigerants contained in the mixed refrigerant. The first height is lower than a height at which an end of a refrigerant pipe, other than the injection pipe, is located within the refrigerant reservoir.

Advantageous Effects of Invention

According to the present disclosure, the disproportionation reaction can be suppress and the deterioration of performance of the refrigeration cycle device can be suppressed.

DESCRIPTION OF EMBODIMENTS

Hereinafter, embodiments will be described, with reference to the accompanying drawings.

Embodiment 1

Figure 1:
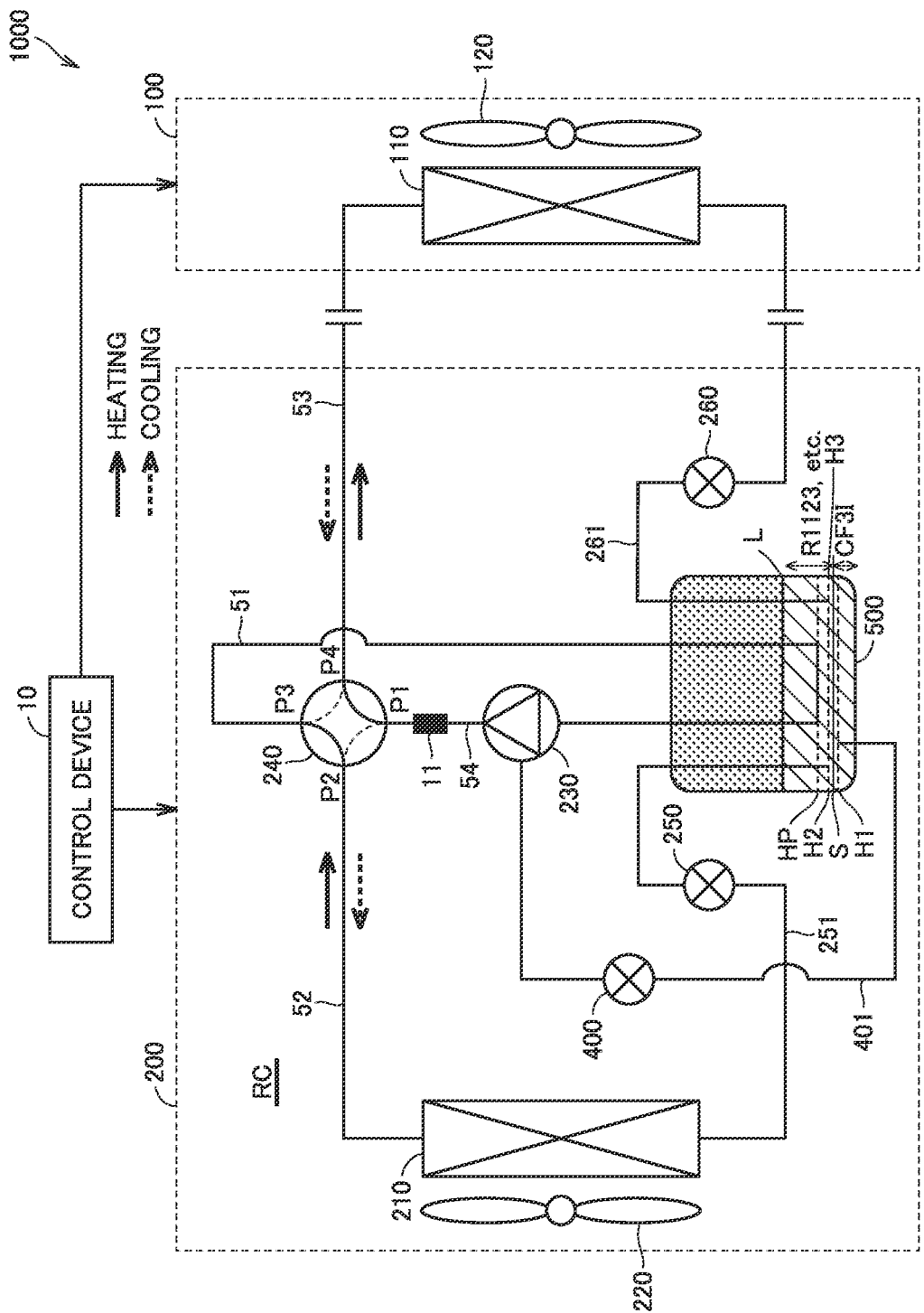
FIG. 1 is a diagram depicting a configuration of a refrigeration cycle device 1000 according to Embodiment 1.

FIG. 1 is a diagram depicting a configuration of a refrigeration cycle device 1000 according to Embodiment 1.

The refrigeration cycle device 1000 includes an indoor unit 100 and an outdoor unit 200. While FIG. 1 shows one indoor unit 100, the refrigeration cycle device 1000 may include multiple indoor units 100.

The outdoor unit 200 includes an outdoor heat exchanger 210, an outdoor fan 220, a compressor 230, a flow switch (a flow switch valve) 240, a first expansion valve 250, a second expansion valve 260, a receiver (a refrigerant container) 500, an injection valve 400, and a discharge temperature sensor 11. The receiver 500 is one example of the refrigerant reservoir.

The indoor unit 100 includes an indoor heat exchanger 110 and an indoor fan 120.

The outdoor fan 220 is disposed near the outdoor heat exchanger 210. The indoor fan 120 is disposed near the indoor heat exchanger 110.

The compressor 230, the flow switch 240, the first expansion valve 250, the second expansion valve 260, the receiver (the refrigerant container) 500, and the indoor heat exchanger 110 form a refrigerant circuit RC. A mixed refrigerant circulates around the refrigerant circuit RC. The mixed refrigerant contains at least CF3I and HFO1123. CF3I has the largest fluid density among refrigerants contained in the mixed refrigerant.

Three conditions, which are a high pressure, a high temperature, and external energy, are satisfied, a disproportionation reaction takes place. Thus, a disproportionation reaction is likely to occur at the compressor 230 in the refrigerant circuit RC. If at least a large amount CF3I, among the total amount, flows into the compressor 230, the disproportionation reaction can be suppressed and the deterioration of the performance of the refrigeration cycle device 1000 can be prevented. CF3I has a fluid density about 2.2 times the fluid density of HFO1123. Accordingly, as the mixed refrigerant flows into the receiver 500, CF3I is likely to be accumulated deep within the receiver 500. In the present embodiment, the amount of CF3I in the compressor 230 is increased by injecting into the compressor 230 the refrigerant deep within the receiver 500.

The refrigerant circuit RC includes refrigerant pipes 51, 52, 53, 54, 251, and 261.

The flow switch 240 is formed of a four-way valve, for example.

The flow switch 240 has a first opening P1 connected to the compressor 230 by the refrigerant pipe (a first refrigerant pipe) 54.

The flow switch 240 has a second opening P2 connected to the outdoor heat exchanger 210 by the refrigerant pipe (a second refrigerant pipe) 52.

The flow switch 240 has a third opening P3 connected to the compressor 230 by the refrigerant pipe 51 (a third refrigerant pipe). A portion of the refrigerant pipe 51 passes inside the receiver 500. This causes the mixed refrigerant flowing through the refrigerant pipe 51 and the mixed refrigerant in the receiver 500 to exchange heat. The lowest portion of the refrigerant pipe 51 in the vertical direction will be referred to as HP.

The flow switch 240 has a fourth opening P4 connected to the indoor heat exchanger 110 by the refrigerant pipe 53 (a fourth refrigerant pipe).

The refrigerant pipe (a fifth refrigerant pipe) 251 has a first end at a second height H2 within the receiver 500 in the vertical direction, and a second end connected to the outdoor heat exchanger 210. The refrigerant pipe 251 includes the first expansion valve 250.

The refrigerant pipe (a sixth refrigerant pipe) 261 has a first end at a third height H3 within the receiver 500 in the vertical direction, and a second end connected to the indoor heat exchanger 110. The refrigerant pipe 261 includes the second expansion valve 260.

The outdoor unit 200 includes an injection pipe 401 and the injection valve 400.

The injection pipe 401 has a first end at a first height H1 within the receiver 500 in the vertical direction, and a second end connected to the compressor 230. The injection valve 400 is included in the injection pipe 401. The injection valve 400 may be a solenoid operated valve that can turn on/off, or an electronic expansion valve that can change the valve travel.

As shown in FIG. 1, a mixed refrigerant is accumulated in the receiver 500. FIG. 1 shows a liquid level L. A gas refrigerant is accumulated above the liquid level L, and a liquid refrigerant is accumulated below the liquid level L.

The first height H1 is lower than a height at which an end of a refrigerant pipe, other than the injection pipe 401, is located within the receiver 500. Specifically, H2 is higher than H1 and H3 is higher than H1. H2 may be equal to H3 or H2 may not be equal to H3. HP may be greater than H2 and HP may be greater than H3.

While the refrigeration cycle device 1000 is in operation, the refrigerants contained in the mixed refrigerant are not perfectly separated by fluid density in the receiver 500. However, the deeper within the receiver 400, the greater the ratio of CF3I is. Since H2 is greater than H1 and H3 is greater than H1, CF3I, which has the largest fluid density, can be the primary component of the refrigerant injected from the receiver 500 to the compressor 230 through the injection pipe 401 and the injection valve 400. This yields advantageous effects of suppressing the disproportionation reaction if, for example, the mass ratio of CF3I is greater by 2 wt % than the mass ratio of HFO1123 being 60% in the compressor 230, and advantageous effects of sufficiently suppressing the occurrence of the disproportionation reaction if the mass ratio of CF3I is about 5%.

In the compressor 230, the total amount of R32, HFO1123, and CF3I to the mixed refrigerant is, preferably, 99.5 wt % or greater, more preferably, 99.7 wt % or greater, and, most preferably, 99.9 wt % or greater.

While the refrigeration cycle device 1000 is not in operation, the refrigerants contained in the mixed refrigerant is almost fully classified by fluid density in the receiver 500. CF3I is accumulated deepest within the receiver 500. H2 may be greater than S, H3 may be greater than S, and S may be greater than H1, where S denotes the height of the surface of separation of CF3I from the other refrigerants such as HFO1123.

The control device 10 opens the injection valve 400, thereby injecting the refrigerant having a low temperature from the receiver 500 to the compressor 230 and cooling the compressor 230. This reduces the discharge temperature of the compressor 230.

The control device 10 controls the drive frequency of the compressor 230, thereby controlling the amount of mixed refrigerant discharged by the compressor 230 per unit time so that the temperature inside the indoor unit 100, obtained by a temperature sensor not shown, is a desired temperature (e.g., a temperature set by a user).

The control device 10 controls the valve travels of the first expansion valve 250 and the second expansion valve 260 so that the degree of superheat or supercooling of the mixed refrigerant has a value within a desired range. While the refrigeration cycle device 1000 is in the cooling operation, the first expansion valve 250 controls the degree of supercooling of the mixed refrigerant at the outlet of the outdoor heat exchanger 210 or the intermediate pressure of the receiver 500, and the second expansion valve 260 controls the degree of suction superheat of the mixed refrigerant suctioned into the compressor 230 (hereinafter, a degree of suction superheat), the temperature of the mixed refrigerant discharged from the compressor 230 (hereinafter, a discharge temperature), and the degree of discharge superheat of the mixed refrigerant discharged from the compressor 230 (hereinafter, a degree of discharge superheat). While the refrigeration cycle device 1000 is in the heating operation, the first expansion valve 250 controls the degree of suction superheat, the discharge temperature, and the degree of discharge superheat, and the second expansion valve 260 controls the degree of supercooling of the refrigerant at the outlet of the indoor heat exchanger 110 or the intermediate pressure of the indoor heat exchanger 110.

The control device 10 controls air delivery rates per unit time from the outdoor fan 220 and the indoor fan 120.

The control device 10 obtains a discharge temperature Td from the discharge temperature sensor 11, which is the temperature of the mixed refrigerant discharged from the compressor 230. The control device 10 controls the valve travel of the injection valve 400, based on the discharge temperature Td.

The control device 10 controls the flow switch 240, thereby changing the direction of circulation of the mixed refrigerant.

During the cooling operation, the control device 10 connects the first opening P1 and the second opening P2 of the flow switch 240, and the third opening P3 and the fourth opening P4. This brings the discharge port of the compressor 230 and the outdoor heat exchanger 210 into communication, and the indoor heat exchanger 110 and the inlet of the compressor 230 into communication.

During the cooling operation, the mixed refrigerant circulates in order from the compressor 230, the flow switch 240, the outdoor heat exchanger 210, the first expansion valve 250, the receiver 500, the second expansion valve 260, the indoor heat exchanger 110, the flow switch 240, the receiver 500, and the compressor 230. CF3I, contained in the mixed refrigerant flown from the first expansion valve 250 into the receiver 500, which has a great fluid density, can mostly be injected to the compressor 230 through the injection pipe 401 and the injection valve 400.

During the heating operation, the control device 10 connects the first opening P1 and the fourth opening P4 of the flow switch 240, and the second opening P2 and the third opening P3. This brings the discharge port of the compressor 230 and the indoor heat exchanger 110 into communication, and the outdoor heat exchanger 210 and the inlet of the compressor 230 into communication.

During the heating operation, the mixed refrigerant circulates in order from the compressor 230, the flow switch 240, the indoor heat exchanger 110, the second expansion valve 260, the receiver 500, the first expansion valve 250, the outdoor heat exchanger 210, the flow switch 240, the receiver 500, and the compressor 230. CF3I, contained in the mixed refrigerant flown from the second expansion valve 260 into the receiver 500, which has a great fluid density, can mostly be injected to the compressor 230 through the injection pipe 401 and the injection valve 400.

Figure 2:
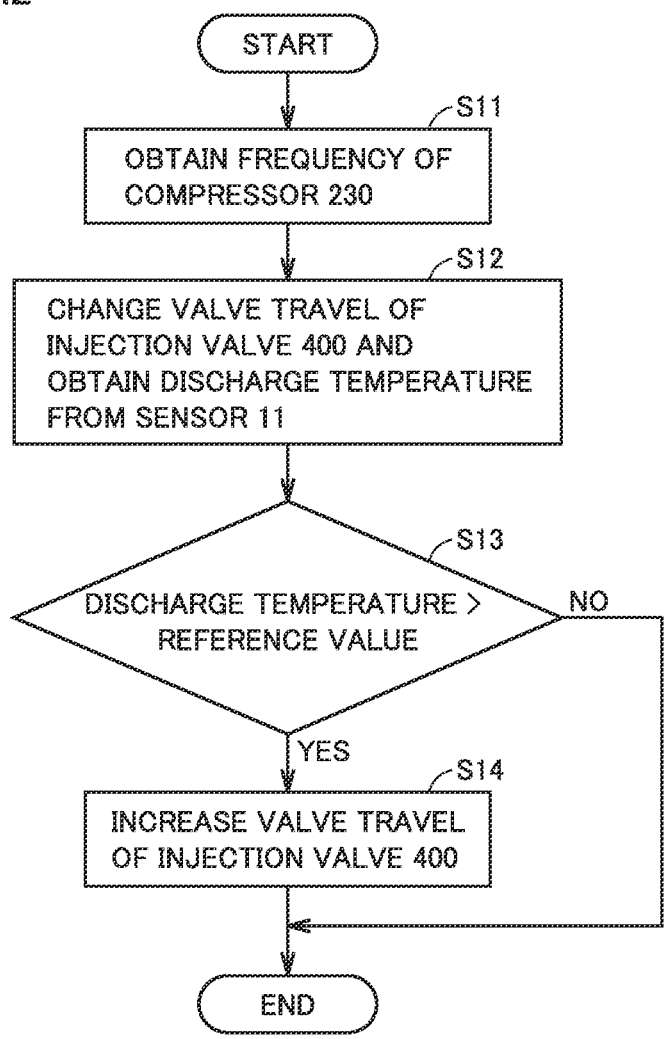
FIG. 2 is a flowchart illustrating a procedure for controlling an injection valve 400.

FIG. 2 is a flowchart illustrating a procedure for controlling the injection valve 400.

In step S11, the control device 10 obtains the frequency of the compressor 230.

In step S12, the control device 10 determines an optimal valve travel for the injection valve 400 in accordance with the frequency of the compressor 230, and changes the valve travel of the injection valve 400 to the determined valve travel.

If the injection valve 400 has a small valve travel, a large amount of CF3I flows into the evaporator (the indoor heat exchanger 110 or the outdoor heat exchanger 210), and the performance of the refrigeration cycle device 1000 is thereby deteriorated. If the injection valve 400 has a large valve travel, too much CF3I is injected into the compressor 230. As a result, the performance of the refrigeration cycle device 1000 deteriorates. The performance of the refrigeration cycle device 1000 can be enhanced by the control device 10 changing the valve travel of the injection valve 400 to an optimal valve travel.

In step S13, the control device 10 obtains the discharge temperature Td of the compressor 230 from the discharge temperature sensor 11. If the discharge temperature Td is greater than a reference value TH, the control device 10 proceeds to step S14. If the discharge temperature Td is not greater than the reference value TH, the process ends. The reference value TH is determined by experiment or simulation.

In step S14, the control device 10 increases the valve travel of the injection valve 400. This can reduce the discharge temperature.

As described above, according to the present embodiment, the amount of CF3I in the compressor 230 can be increased by injecting the refrigerant deeper within the receiver 500 to the compressor 230 through the injection pipe 401 and the injection valve 400. This obviates the need to increase the amount of CF3I contained in the mixed refrigerant for purpose of suppressing the occurrence of the disproportionation reaction. Thus, according to the present embodiment, the disproportionation reaction can be suppressed and the deterioration of the performance of the refrigeration cycle device 1000 can be prevented.

Embodiment 2

Figure 3:
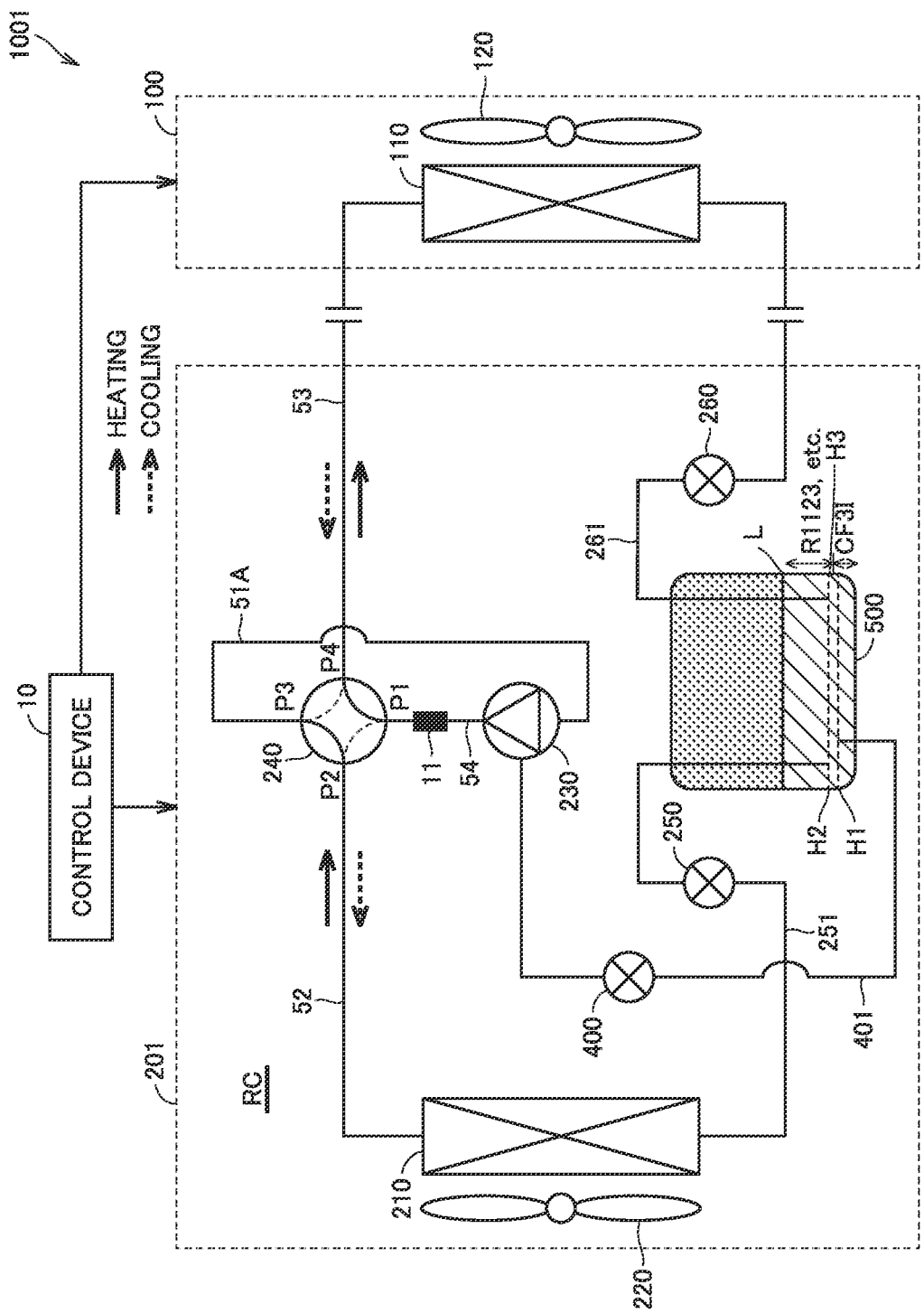
FIG. 3 is a diagram depicting a configuration of a refrigeration cycle device 1001 according to Embodiment 2.

FIG. 3 is a diagram depicting a configuration of a refrigeration cycle device 1001 according to Embodiment 2.

The refrigeration cycle device 1001 includes an outdoor unit 201, and an indoor unit 100 which is the same as one according to Embodiment 1.

The outdoor unit 201 according to Embodiment 2 differs from the outdoor unit 200 according to Embodiment 1 in that the outdoor unit 201 according to Embodiment 2 includes a refrigerant pipe 51A, instead of the refrigerant pipe 51.

The refrigerant pipe 51A does not pass inside the receiver 500. Accordingly, a mixed refrigerant flowing through the refrigerant pipe 51A exchange no heat with a mixed refrigerant in the receiver 500.

According to the present embodiment, the refrigerant pipe 51A has a reduced length shorter than the refrigerant pipe 51 according to Embodiment 1, thereby achieving a reduced cost of the refrigeration cycle device.

Embodiment 3

Figure 4:
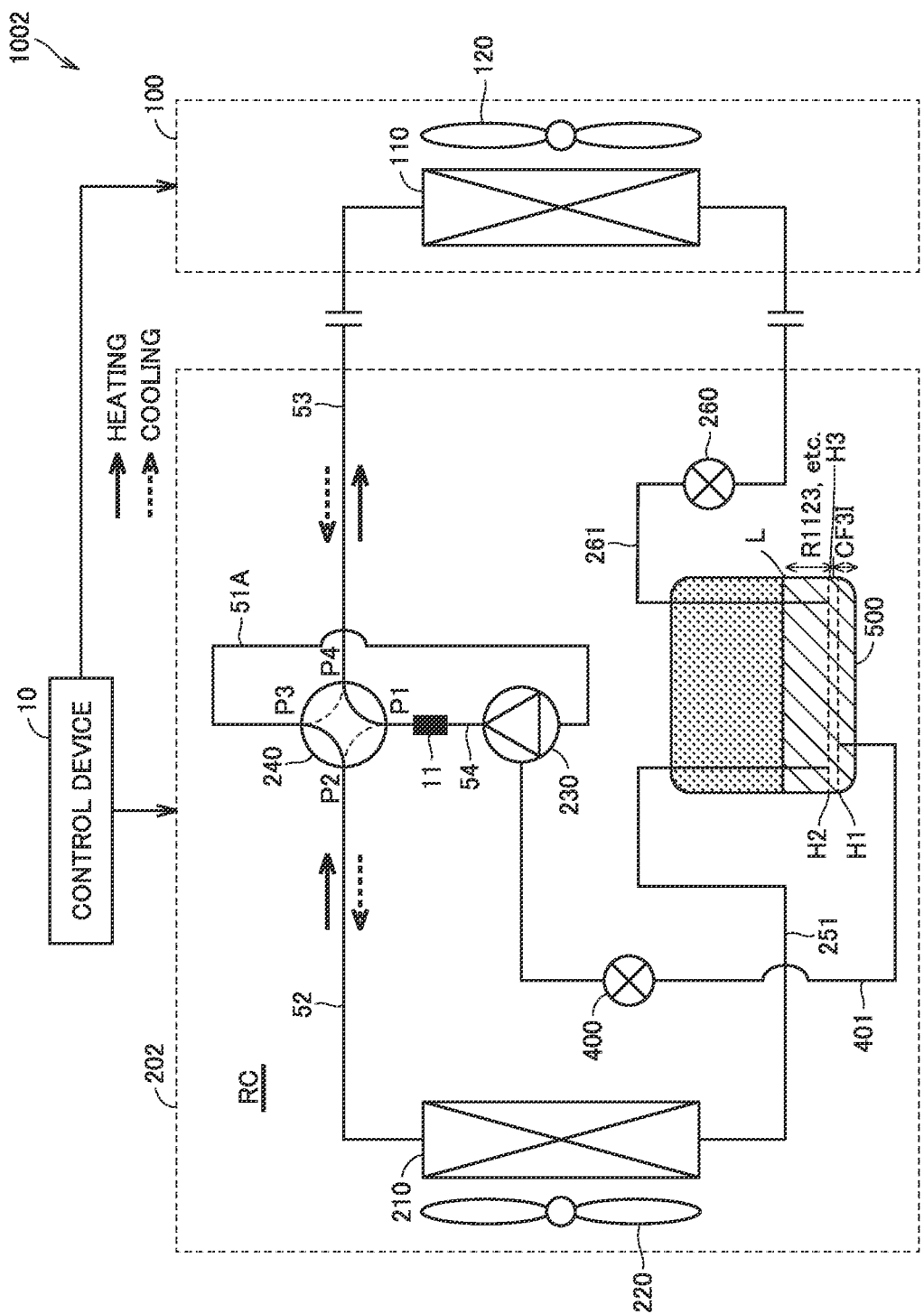
FIG. 4 is a diagram depicting a configuration of a refrigeration cycle device 1002 according to Embodiment 3.

FIG. 4 is a diagram depicting a configuration of a refrigeration cycle device 1002 according to Embodiment 3.

The refrigeration cycle device 1002 includes an outdoor unit 202, and an indoor unit 100 which is the same as one according to Embodiment 1.

The outdoor unit 202 according to Embodiment 3 differs from the outdoor unit 201 according to Embodiment 2 in that the outdoor unit 202 according to Embodiment 3 does not include the first expansion valve 250.

In the present embodiment, the second expansion valve 260 controls the degree of suction superheat, the discharge temperature, and the degree of discharge superheat during the cooling operation and the heating operation.

According to the present embodiment, there is no need to provide the first expansion valve 250, thereby achieving a reduced cost of the refrigeration cycle device.

Embodiment 4

Figure 5:
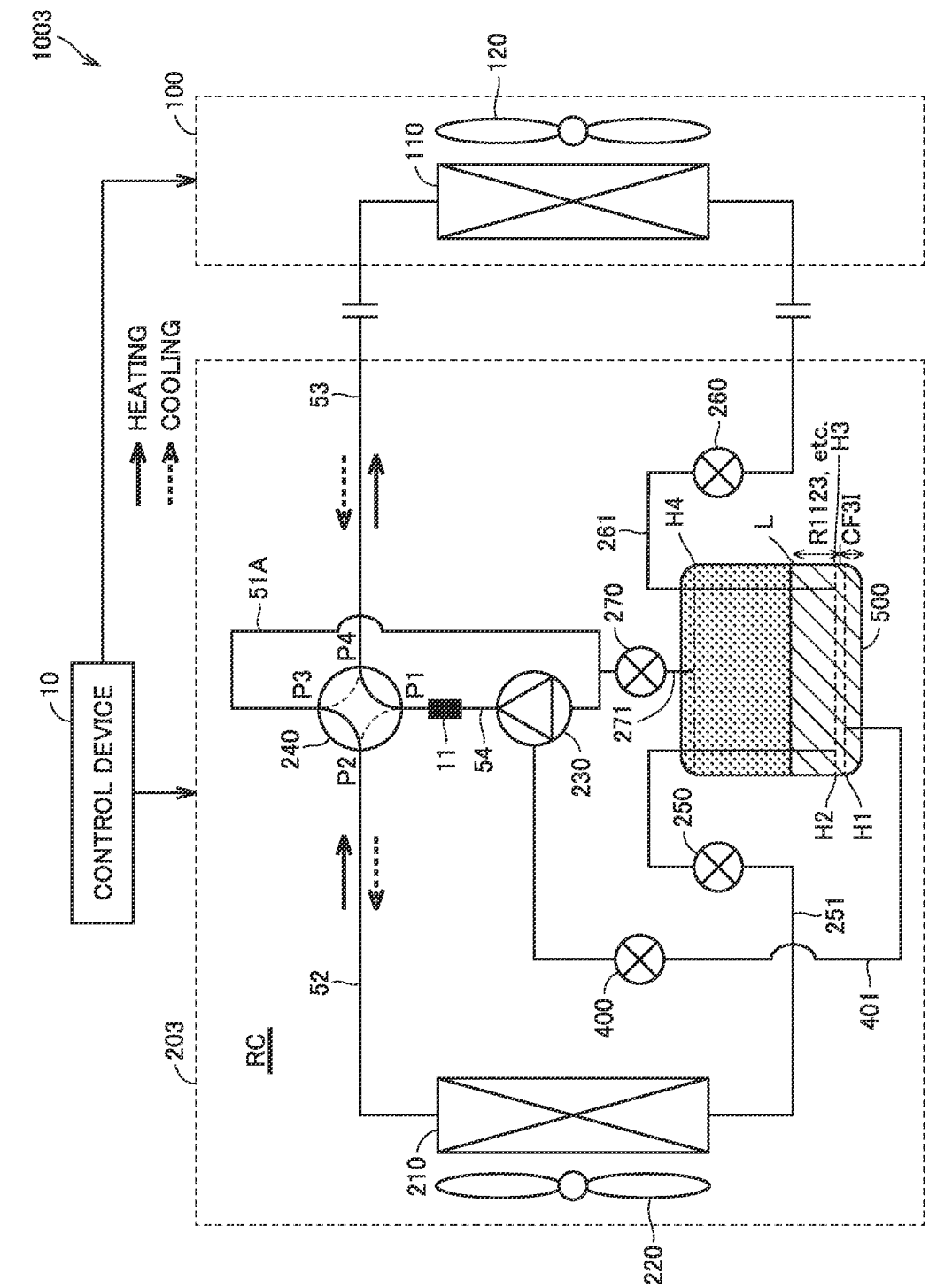
FIG. 5 is a diagram depicting a configuration of a refrigeration cycle device 1003 according to Embodiment 4.

FIG. 5 is a diagram depicting a configuration of a refrigeration cycle device 1003 according to Embodiment 4.

The refrigeration cycle device 1003 includes an outdoor unit 203, and an indoor unit 100 which is the same as one according to Embodiment 1.

The outdoor unit 203 according to Embodiment 4 differs from the outdoor unit 201 according to Embodiment 2 in that the outdoor unit 203 according to Embodiment 4 includes a gas bypass pipe 271 and a bypass valve 270.

The gas bypass pipe 271 has a first end at a fourth height H4 within the receiver 500 in the vertical direction, and a second end connected to a refrigerant pipe 51A. H4 is greater than H1, H4 is greater than H2, and H4 is greater than H3.

The bypass valve 270 is included in the gas bypass pipe 271.

The mixed refrigerant in a gaseous state in the receiver 501 is sent to the suction side of the compressor 230 through the gas bypass pipe 271, the bypass valve 270, and the refrigerant pipe 51A.

The bypass valve 270 may have a fixed restriction like a capillary tube, or an electronic expansion valve that can change the valve travel.

According to the present embodiment, a portion of the mixed refrigerant flows on a second flow path directly from the receiver to the compressor, bypassing a first flow path from the receiver to the compressor via the evaporator (the outdoor heat exchanger or the indoor heat exchanger). This can suppress the pressure drop of the evaporator, and achieve an enhanced performance of the refrigeration cycle device.

Embodiment 5

Figure 6:
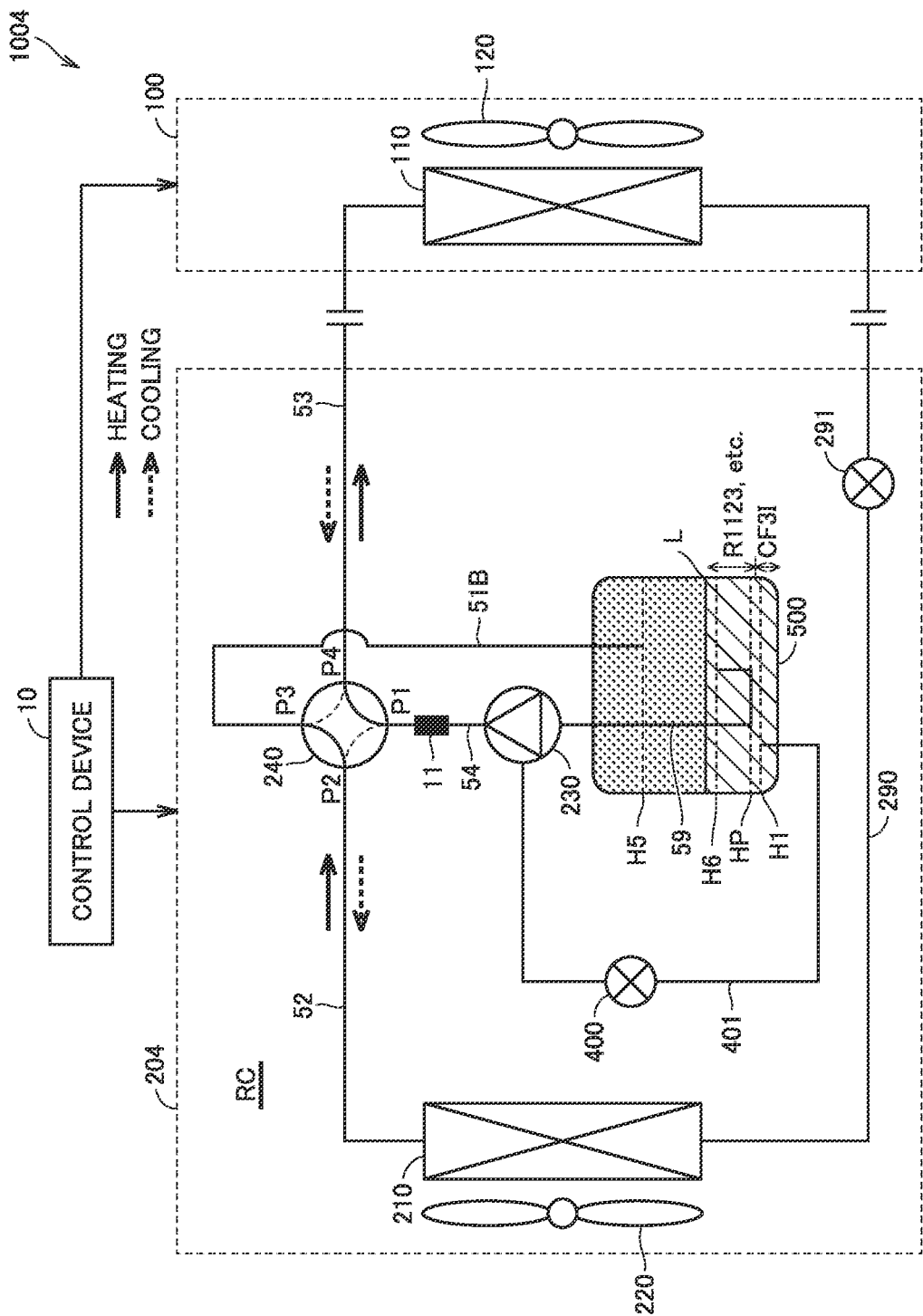
FIG. 6 is a diagram depicting a configuration of a refrigeration cycle device 1004 according to Embodiment 5.

FIG. 6 is a diagram depicting a configuration of a refrigeration cycle device 1004 according to Embodiment 5.

The refrigeration cycle device 1004 includes an outdoor unit 204, and an indoor unit 100 which is the same as one according to Embodiment 1.

The outdoor unit 204 according to Embodiment 5 differs from the outdoor unit 201 according to Embodiment 2 in that the outdoor unit 204 according to Embodiment 5 does not include the first expansion valve 250, and includes a refrigerant pipe 51B, instead of the refrigerant pipes 51A and 251. The refrigeration cycle device 1004 according to Embodiment 5 includes a refrigerant pipe 59, instead of the refrigerant pipe 261.

The refrigerant pipe (a third refrigerant pipe) 51B has a first end at a fifth height H5 within the receiver 500 in the vertical direction, and a second end connected to the third opening P3 of a flow switch.

The refrigerant pipe (a seventh refrigerant pipe) 59 has a first end at a sixth height H6 within the receiver 500 in the vertical direction, and a second end connected to the suction side of the compressor 230.

Here, H5 is greater than H1, and H5 is greater than H6 which is greater than H1.

A refrigerant pipe (an eighth refrigerant pipe) 290 is disposed outside the receiver 500. The refrigerant pipe 290 connects an outdoor heat exchanger 210 and an indoor heat exchanger 110. The refrigerant pipe 290 includes an expansion valve 291.

The present embodiment has a simplified configuration of the refrigeration cycle device, and thus can achieve a reduced cost of the refrigeration cycle device.

Variations (1) While a mixed refrigerant is injected to the compressor in the embodiments above, the present disclosure is not limited thereto. The present disclosure has similar advantageous effects by, for example, injecting the mixed refrigerant to the suction side (a suction pipe) of the compressor.

(2) While the receiver is used as the refrigerant reservoir in the embodiments above, the present disclosure is not limited thereto. For example, an internal heat exchanger that exchanges heat between a high-pressure refrigerant and a low-pressure refrigerant may be used as the refrigerant reservoir.

The presently disclosed embodiment should be considered in all aspects as illustrative and not restrictive. The scope of the present disclosure is indicated by the appended claims, rather than by the description above, and all changes that come within the scope of the claims and the meaning and range of equivalency of the claims are intended to be embraced within their scope.

REFERENCE SIGNS LIST 10 control device; 11 discharge temperature sensor; 51, 51A, 51B, 52, 53, 54, 59, 251, 261, 290 refrigerant pipe; 100 indoor unit; 110 indoor heat exchanger; 120 indoor fan; 200, 201, 202, 203, 204 outdoor unit; 210 outdoor heat exchanger; 220 outdoor fan; 230 compressor; 240 flow switch; 250 first expansion valve; 260 second expansion valve; 270 bypass valve; 271 gas bypass pipe; 291 expansion valve; 400 injection valve; 401 injection pipe; 500 receiver; 1000, 1001, 1002, 1003, 1004 refrigeration cycle device; P1 first opening; P2 second opening; P3 third opening; P4 fourth opening; and RC refrigerant circuit.

The invention claimed is:

1. A refrigeration cycle device comprising:
a refrigerant circuit which circulates a mixed refrigerant containing at least CF3I and HFO1123, the refrigerant circuit including a compressor, at least one expansion valve, an indoor heat exchanger, an outdoor heat exchanger, and a refrigerant reservoir;
an injection pipe which includes a first end at a first height within the refrigerant reservoir and a second end connected to the compressor; and
an injection valve included in the injection pipe, wherein
the CF3I has a greatest fluid density among refrigerants contained in the mixed refrigerant, and
the first height is lower than a height at which an end of a refrigerant pipe, other than the injection pipe, is located within the refrigerant reservoir,
wherein
the refrigerant circuit further includes:
a flow switch;
a first refrigerant pipe connecting a discharge side of the compressor and a first opening of the flow switch,
a second refrigerant pipe connecting the outdoor heat exchanger and a second opening of the flow switch,
a third refrigerant pipe connecting a suction side of the compressor and a third opening of the flow switch,
a fourth refrigerant pipe connecting the indoor heat exchanger and a fourth opening of the flow switch, and
a fifth refrigerant pipe having a first end at a second height within the refrigerant reservoir and a second end connected to the outdoor heat exchanger, wherein
the second height is higher than the first height, and
the fifth refrigerant pipe includes the expansion valve.

2. A refrigeration cycle device comprising:
a refrigerant circuit which circulates a mixed refrigerant containing at least CF3I and HFO1123, the refrigerant circuit including a compressor, at least one expansion valve, an indoor heat exchanger, an outdoor heat exchanger, and a refrigerant reservoir;

an injection pipe which includes a first end at a first height within the refrigerant reservoir and a second end connected to the compressor; and an injection valve included in the injection pipe, wherein the CF3I has a greatest fluid density among refrigerants contained in the mixed refrigerant, and the first height is lower than a height at which an end of a refrigerant pipe, other than the injection pipe, is located within the refrigerant reservoir, wherein the refrigerant circuit further includes:

a flow switch;

a first refrigerant pipe connecting a discharge side of the compressor and a first opening of the flow switch, a second refrigerant pipe connecting the outdoor heat exchanger and a second opening of the flow switch, a third refrigerant pipe connecting a suction side of the compressor and a third opening of the flow switch, and a fourth refrigerant pipe connecting the indoor heat exchanger and a fourth opening of the flow switch, a sixth refrigerant pipe having a first end at a third height within the refrigerant reservoir and a second end connected to the indoor heat exchanger, wherein the third height is higher than the first height.

3. The refrigeration cycle device according to claim 2, wherein the sixth refrigerant pipe includes the expansion valve.

4. A refrigeration cycle device comprising:

a refrigerant circuit which circulates a mixed refrigerant containing at least CF3I and HFO1123, the refrigerant circuit including a compressor, at least one expansion valve, an indoor heat exchanger, an outdoor heat exchanger, and a refrigerant reservoir;

an injection pipe which includes a first end at a first height within the refrigerant reservoir and a second end connected to the compressor; and an injection valve included in the injection pipe, wherein the CF3I has a greatest fluid density among refrigerants contained in the mixed refrigerant, and the first height is lower than a height at which an end of a refrigerant pipe, other than the injection pipe, is located within the refrigerant reservoir, wherein the refrigerant circuit further includes:

a flow switch;

a first refrigerant pipe connecting a discharge side of the compressor and a first opening of the flow switch, a second refrigerant pipe connecting the outdoor heat exchanger and a second opening of the flow switch, a third refrigerant pipe connecting a suction side of the compressor and a third opening of the flow switch, and a fourth refrigerant pipe connecting the indoor heat exchanger and a fourth opening of the flow switch, wherein the at least one expansion valve includes a first expansion valve and a second expansion valve;

the refrigerant circuit further includes:

a fifth refrigerant pipe having a first end at a second height within the refrigerant reservoir and a second end connected to the outdoor heat exchanger; and a sixth refrigerant pipe having a first end at a third height within the refrigerant reservoir and a second end connected to the indoor heat exchanger, wherein the fifth refrigerant pipe includes the first expansion valve, the sixth refrigerant pipe includes the second expansion valve, the second height is higher than the first height, and the third height is higher than the first height.

5. The refrigeration cycle device according to claim 4, wherein the third refrigerant pipe passes inside the refrigerant reservoir.

6. The refrigeration cycle device according to claim 4, wherein the third refrigerant pipe does not pass inside the refrigerant reservoir.

7. The refrigeration cycle device according to claim 6, further comprising a gas bypass pipe having a first end at a fourth height within the refrigerant reservoir and a second end connected to the third refrigerant pipe; and a bypass valve included in the gas bypass pipe, wherein the fourth height is higher than the first height, the second height, and the third height.

* * * * *